United States Patent
Yoshida et al.

(10) Patent No.: US 6,917,676 B2
(45) Date of Patent: Jul. 12, 2005

(54) TELEPHONE SET, REPEATING DEVICE AND RECORDING MEDIUM

(75) Inventors: Takahiro Yoshida, Koriyama (JP); Masaru Noji, Koriyama (JP); Takahiro Sasaki, Koriyama (JP); Tadashi Saito, Koriyama (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 09/964,333

(22) Filed: Sep. 28, 2001

(65) Prior Publication Data

US 2003/0063727 A1 Apr. 3, 2003

(51) Int. Cl.⁷ .............................................. H04M 3/54
(52) U.S. Cl. ........................ 379/207.02; 379/207.02; 379/201.1; 379/212.01
(58) Field of Search .................. 379/207.02, 201.01, 379/201.1, 202.01, 207.01, 207.12, 211.01, 211.02, 212.01, 215.01, 507.02

(56) References Cited

U.S. PATENT DOCUMENTS 5,757,901 A * 5/1998 Hiroshige .............. 379/212.01

FOREIGN PATENT DOCUMENTS

| JP | 7170288 | 7/1995 |
|----|---------|--------|
| JP | 998227 | 4/1997 |
| JP | 9214484 | 8/1997 |
| JP | 1051453 | 2/1998 |
| JP | 10173707 | 6/1998 |
| JP | 10327195 | 12/1998 |
| JP | 2000165516 | 6/2000 |
| JP | 2001053755 | 2/2001 |

OTHER PUBLICATIONS

R. Sparks, "SIP Call Control Transfer", Internet Engineering Task Force, Internet Draft, Jul. 2000, pp. 1–17.

* cited by examiner

Primary Examiner—William J. Deane, Jr.
(74) Attorney, Agent, or Firm—Mattingly, Stanger, Malur, Brundidge, P.C.

(57) ABSTRACT

A telephone 12a connected to a local area network 10, comprising a means for requesting during communication a response from another receiver-side telephone 12b indicating its availability to receive a call, and a means for notifying the address of the receiver-side telephone 12b that responded to the caller-side telephone 22a.

1 Claim, 6 Drawing Sheets

TELEPHONE SET, REPEATING DEVICE AND RECORDING MEDIUM

FIELD OF THE INVENTION

The present invention relates to a repeating device, a telephone set and a recording medium, and especially relates to the communication technology of relaying via a communication line telephone devices connected to a local area network.

Figure 6:
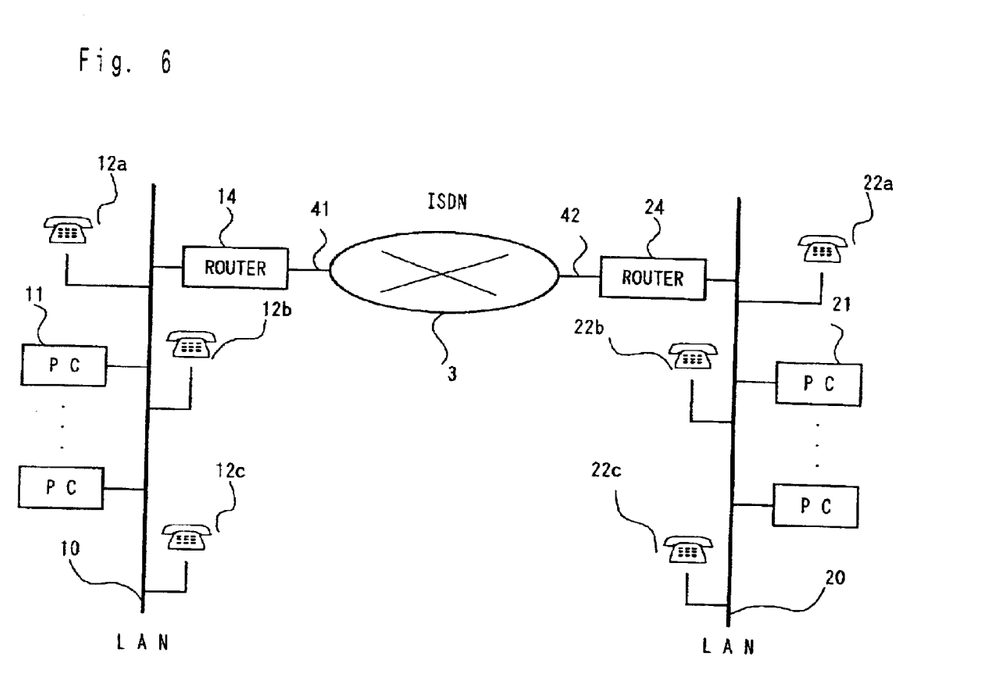
FIG. 6 is an explanatory view showing the minimum system environment in which the LAN telephone and the repeating device operate.

Heretofore, voice communication between dedicated telephone sets connectable to a local area network (hereinafter called LAN telephones) and voice communication between personal computers (PCs) connected to the local area network are realized by a VoIP (Voice over IP) technology that processes the voice signal into packets and transmits the packets through the network. As shown in FIG. 6, in a minimum system environment in which the LAN telephones and the repeating device operate, PCs 11 and telephone sets 12a–12c connected to a receiver-side LAN 101 is connected via a router 14, an integrated services digital network (hereinafter called ISDN) 3, and connecting lines 41 and 42 to PCs 21 and telephone sets 22a–22c connected to a caller-side LAN 20.

According to such system environment, the communication method realizing calls between LAN telephones connected either to the same local area network or to different local area networks having different subnet addresses via a subscriber line can be applied to connect calls that designate a specific address, but there is conventionally no transfer system that enables the LAN telephone connected to a local area network to perform a transfer process.

SUMMARY OF THE INVENTION

The object of the present invention is to provide a telephone set, a repeating device, and a recording medium that enables a LAN telephone engaged in communication to transfer the communication to another LAN telephone connected to the same local area network or to a different local area network relayed by a communication line having a different subnet address.

The present invention provides a telephone connected to a local area network; said telephone comprising, during communication, a function for requesting a response from another receiver-side telephone indicating its availability to connect a call, and a function for notifying the address of the receiver-side telephone that responded to a caller-side telephone.

Moreover, the present invention provides a repeating device for relaying communication to a plurality of receiver-side telephones that are connected to a local area network; the repeating device comprising, upon receiving a transfer request from a user, a function for requesting a response from another receiver-side telephone indicating its availability to connect a call, and a function for notifying the address of the receiver-side telephone that responded to a caller-side telephone.

Even further, the present invention provides a recording medium readable by a computer and storing a program to be executed by said computer, said recording medium used either for a telephone being connected to a local area network or for a repeating device for relaying communication to a plurality of receiver-side telephones being connected to a local area network; wherein the program comprises either of the following sets of functions: upon receiving a transfer request from a user, a function for requesting a response from another receiver-side telephone indicating its availability to connect a call, and a function for notifying the address of the receiver-side telephone that responded to a caller-side telephone; or during communication, a function for requesting a response from another receiver-side telephone indicating its availability to connect a call, and a function for notifying the address of the receiver-side telephone that responded to a caller-side telephone.

DETAILED DESCRIPTION OF PREFERRED EMBODIMENTS

The preferred embodiments of to the present invention will now be explained.

Figure 1:
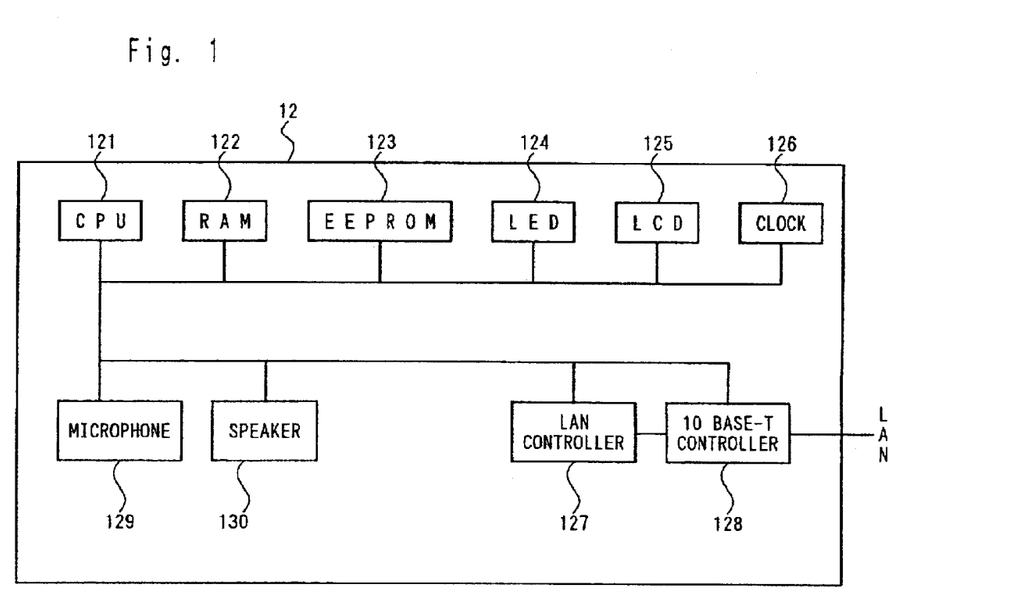
FIG. 1 is an explanatory view showing the functional structure of a logical block of the LAN telephone according to embodiment 1.
Figure 2:
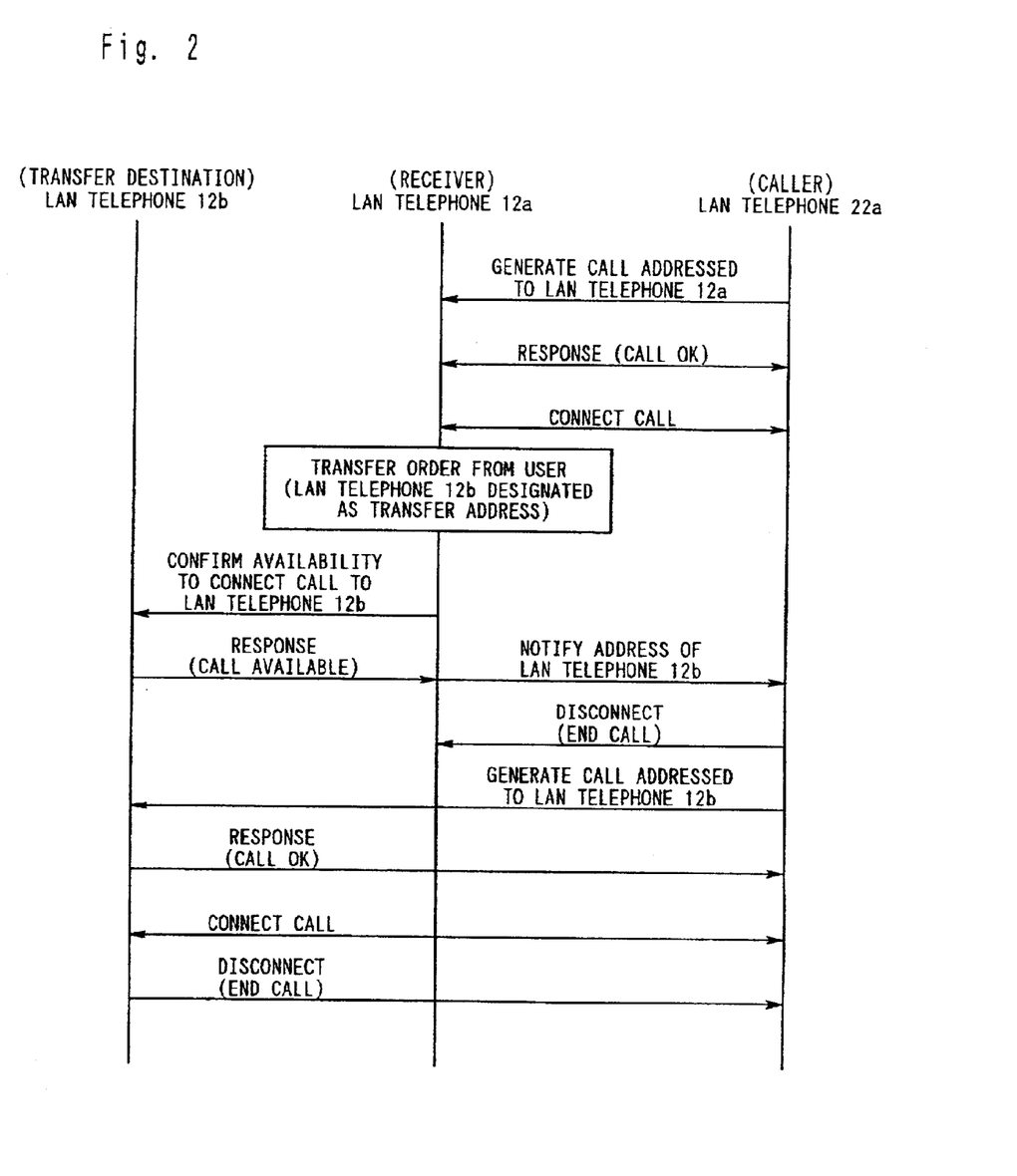
FIG. 2 is an explanatory view showing one example of the transfer operation performed by the LAN telephone according to embodiment 1.
Figure 3:
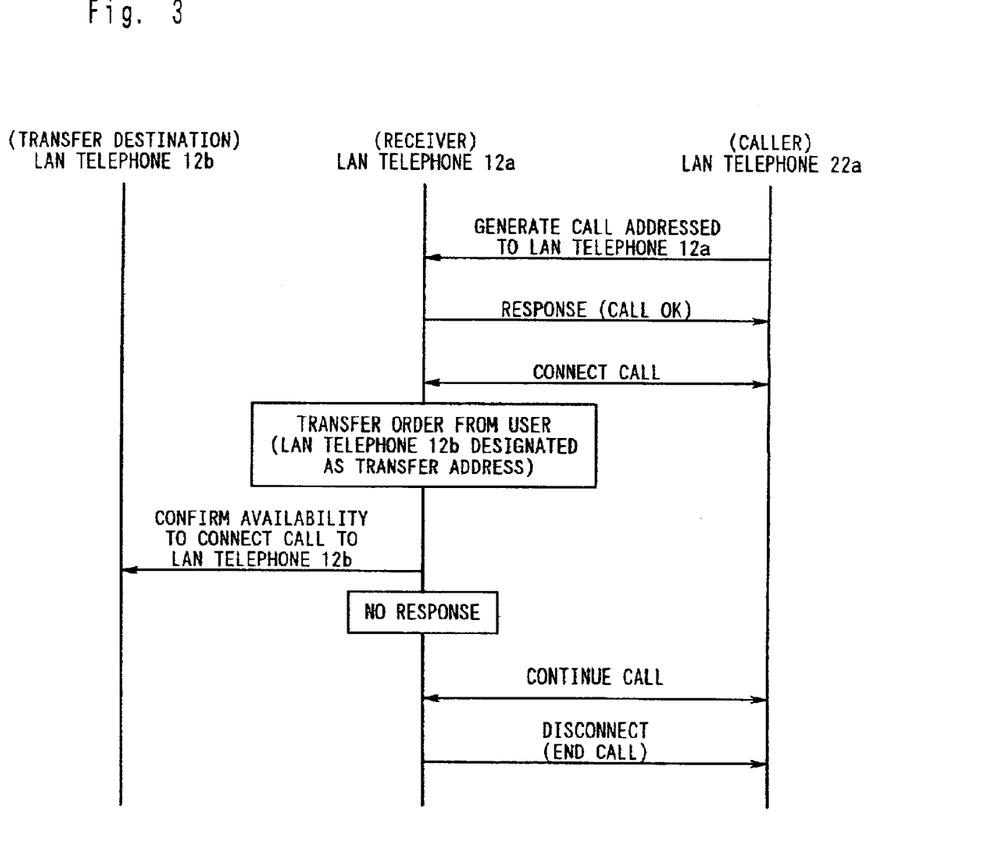
FIG. 3 is an explanatory view showing an example where the transfer cannot be performed by the LAN telephone according to embodiment 1.
Figure 4:
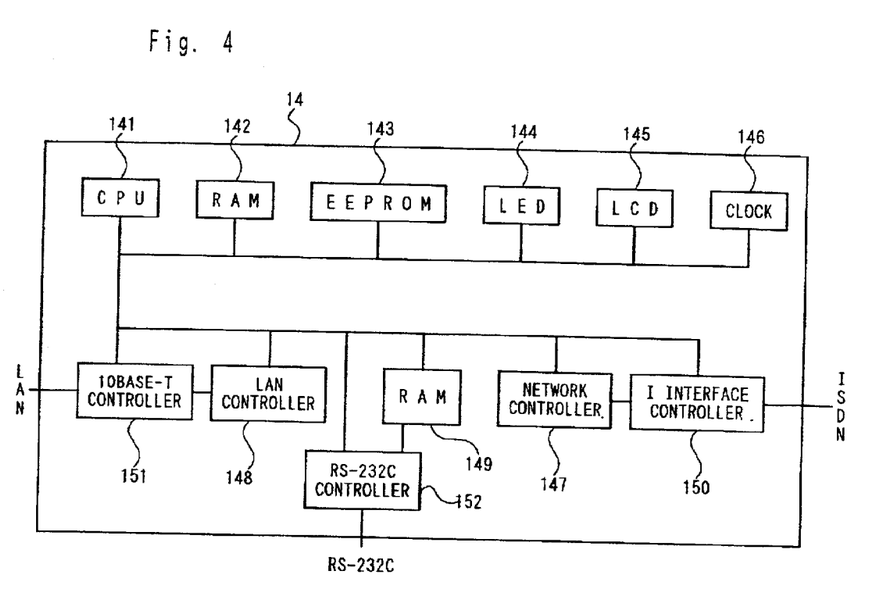
FIG. 4 is an explanatory view showing the functional structure of a logical block of the repeating device according to embodiment 2.
Figure 5:
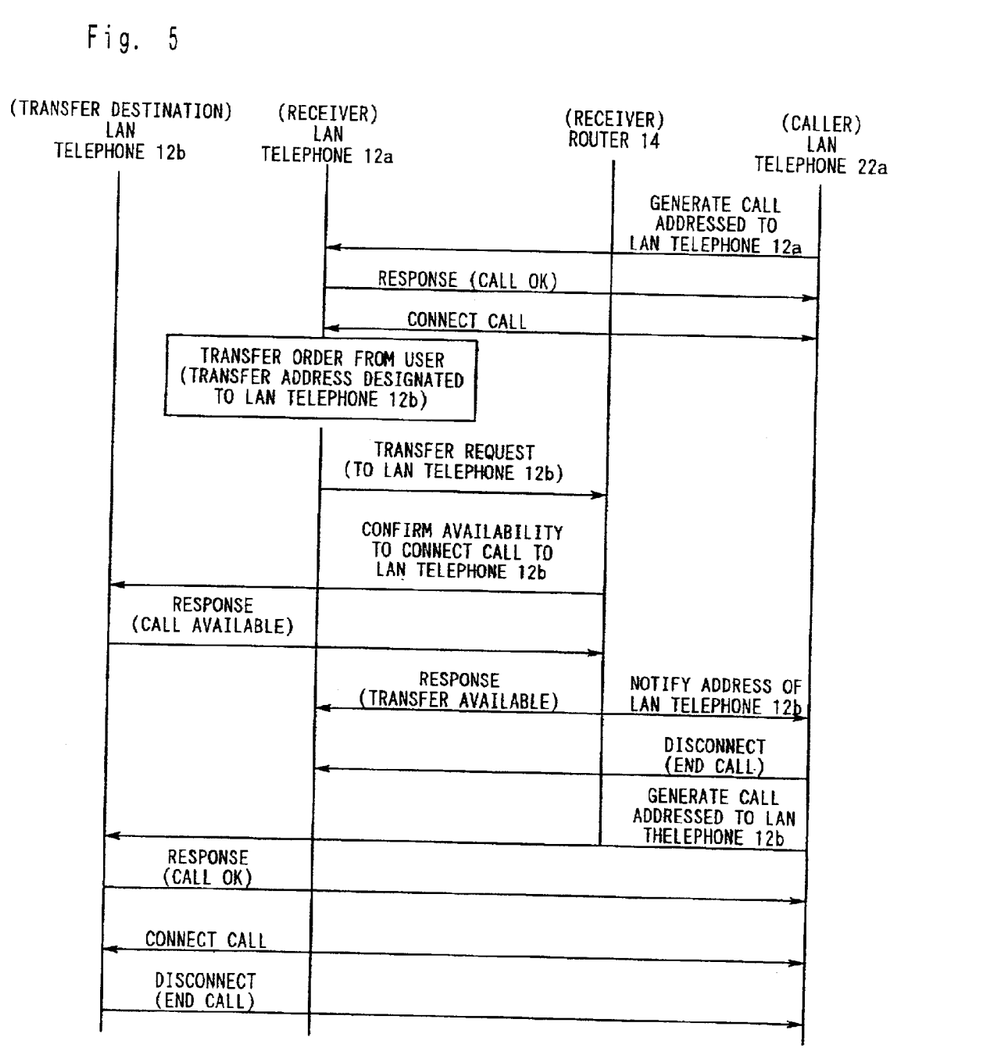
FIG. 5 is an explanatory view showing one example of the transfer operation performed by the repeating device of embodiment 2.

FIGS. 1 through 6 are referred to in explaining the embodiments of the telephone and the repeating device according to the present invention. FIG. 1 is an explanatory view showing the functional structure of the logical block of the LAN telephone according to embodiment 1. FIG. 2 is an explanatory view showing one example of the transfer operation by the LAN telephone according to embodiment 1. FIG. 3 is an explanatory view showing an example where the transfer cannot be performed by the LAN telephone of embodiment 1. FIG. 4 is an explanatory view showing the functional structure of the logical block of the repeating device according to embodiment 2. FIG. 5 is an explanatory view showing one example of the transfer operation by the repeating device of embodiment 2. FIG. 6 is an explanatory view showing the minimum system environment in which the LAN telephone and the repeating device operate.

Embodiment 1 will now be explained. The telephone according to the present embodiment comprises a function for requesting to another receiver-side telephone to reply their availability to connect a call, and a function for notifying the address of the receiver-side telephone that responded to the caller-side telephone. As shown in the functional structure of the logical block in FIG. 1, the telephone 12 according to the present embodiment comprises a CPU 121 having a structure of a microcomputer that facilitates the send-receive of communication data by controlling the whole unit, a RAM 122 functioning as a memory for logical memory, an EEPROM 123 which is a storage memory, an LED 124 and an LCD 125 that show the status of the present unit, a subscriber line (ISDN) and a 10

BASE-T (LAN), and a clock 126. Further, the present telephone comprises a LAN controller 127 that controls the send-receive data with the 10 BASE-T (LAN), and a controller 128 for physically controlling the 10 BASE-T. The telephone further comprises a microphone 129 and a speaker 130 for controlling the voice from the exterior. As shown in FIG. 6, the minimum system environment in which the LAN telephone according to the present embodiment functions is the same as the conventional example, wherein the PCs 11 and the LAN telephones 12a–12c connected to the receiver-side LAN 10 are connected via the router 14, the ISDN 3, and connecting lines 41 and 42 to the PCs 21 and the LAN telephones 22a–22c connected to the caller-side LAN 20.

One example of the transfer operation according to the telephone of embodiment 1 will now be explained with reference to FIG. 2. When the receiver-side LAN telephone 12a which is the telephone according to the present embodiment is communicating with the caller-side LAN telephone 22a and the telephone 12a receives a transfer order from the user (in the present example, the LAN telephone 12b is designated as the transfer destination), the LAN telephone 12a sends a confirmation signal to check the availability of the LAN telephone 12b which is the designated transfer destination, and waits for a reply. The transfer-destination LAN telephone 12b rings a bell, and if the user answers the bell, it returns a "reply (call available)" to the LAN telephone 12a (in the example, the LAN telephone 12b is available for the call). Upon receiving the call available reply, the LAN telephone 12a notifies the address of the LAN telephone 12b to the caller-side LAN telephone 22a. The caller-side telephone 22a disconnects the call with the LAN telephone 12a, terminating the communication with the receiver-side LAN telephone 12a. The caller LAN telephone 22a generates a call to the address of the LAN telephone 12b, and when the transfer-destination LAN telephone 12b receives the call, it returns a "reply (call OK)". Upon receiving the "reply (call OK)", the caller LAN telephone 22a starts the communication using the VoIP protocol, and the transfer process is completed. Thus, the LAN telephone 12a being connected to a call can confirm whether another receiver LAN telephone 12b is capable of receiving a transferred call, and the caller LAN telephone 22a can communicate with the LAN telephone 12b to which the call is transferred.

FIG. 3 is used to explain the case according to the telephone of embodiment 1 in which the transfer-side telephone does not return a reply. During communication with the caller-side LAN telephone 22a, when the receiver-side LAN telephone 12a receives a transfer order from the user (in this example, the LAN telephone 12b is designated as the transfer destination), it outputs a confirmation addressed to the transfer-destination LAN telephone 12b and waits for a reply. The transfer-destination LAN telephone 12b rings a bell, but since there is no reply from the user, the receiver-side LAN telephone 12a ceases the transfer confirmation process, and returns to the communication with the caller-side LAN telephone 22a, and disconnects when terminating the call.

Embodiment 2 will now be explained. The repeating device according to embodiment 2 comprises a function for requesting upon receiving a transfer request from a user a reply to another receiver-side telephone whether it is available for a call or not, and a function for notifying the address of the receiver-side telephone that responded to the caller-side telephone. The functional structure of the logical block of the router 14 according to the present embodiment comprises, as shown in FIG. 4, a CPU 141 having a structure of a microcomputer that facilitates the send-receive of communication data by controlling the whole unit, a RAM 142 functioning as a memory for logical memory, an EEPROM 143 which is a storage memory, an LED 144 and an LCD 145 that show the status of the present unit, a subscriber line (ISDN) and a 10 BASE-T (LAN), and a clock 146. The router 14 further comprises a controller 150 that physically controls the subscriber line (ISDN), a controller 151 that physically controls the 10 BASE-T, and a controller 152 that physically controls the RS-232C. Moreover, the router 14 comprises a network controller 147 and a 10 BASE-T controller 151 for controlling the data being sent to or received from the subscriber line (ISDN), a LAN controller 148 that controls the data being sent to or received from the 10 BASE-T (LAN), and a RAM 149 which is used as the memory in which the network controller 147 or the LAN controller 148 store the send-receive data. The minimum system environment in which the repeating device of embodiment 2 operates is similar to embodiment 1 as shown in FIG. 6, so the explanation thereof is omitted.

One example of the operation of the repeating device according to embodiment 2 will now be explained with reference to FIG. 5. When a call is connected between the caller-side LAN telephone 22a and the receiver-side LAN telephone 12a, the receiver-side LAN telephone 12a receives a transfer request from a user and the transfer destination is designated (in the present example, LAN telephone 12b is designated). The receiver-side LAN telephone 12a outputs a transfer request to the receiver-side router 14 addressed to the LAN telephone 12b. Upon receiving the transfer request, the receiver-side router 14 outputs a confirmation to the address of the transfer-side LAN telephone connected to the LAN 10 asking its availability to connect a call, and waits for a reply. The transfer-side LAN telephone 12b rings a bell, and if the user responds, returns a "reply (call available) to the router 14 (in this case, the telephone 12b is available). Upon receiving the call available signal, the router 14 notifies the address of the transfer-side LAN telephone 12b to the caller-side LAN telephone 22a. Upon receiving the address of the transfer-side LAN telephone 12b, the caller-side LAN telephone 22a generates a call to the address of the transfer-side LAN telephone 12b. The transfer-side LAN telephone 12b receives the call, and returns a "reply (call OK)". The caller-side LAN telephone 22a receives the "reply (call OK)", and starts communication using VoIP protocol, and thus the transfer is completed. As explained, the repeating device, upon receiving a transfer request from a user, can confirm whether the transfer-side LAN telephone 12b is available for receiving the transferred call, and the caller-side LAN telephone 22a can communicate with the transfer-side LAN telephone 12b.

The above embodiments explained the case in which the present invention is applied to a telephone and a repeating device, but it is also possible to store to a recording medium (such as a CD-ROM) readable by a computer and storing a program to be performed by the computer the function for requesting upon receiving the transfer request from the user a response from another receiver-side telephone indicating whether it is available for connecting a call and a function for notifying the address of the receiver-side telephone that responded to the caller-side telephone, or a function for requesting during communication a response from another receiver-side telephone whether it is available to receive a call and a function for notifying the address of the receiver-side telephone that responded to the caller-side telephone. By using this recording medium, the telephone connected to a local area network or a device relaying communication to a plurality of receiver-side telephones connected to a local area network can function as the telephone or the repeating device of the present invention.

According to the present invention, in a communication system enabling communication between LAN telephones by providing a repeating device in a local area network or by relaying local area networks that have different subnet addresses with a communication line, the present invention enables to provide a telephone and a repeating device that are capable of transferring the call connected to a LAN telephone to another LAN telephone.

We claim:

1. A telephone connected to a local area network performing voice communication with another telephone through said local area network, said telephone comprising:

means, operable during voice communication with a transfer-source telephone connected to the local area network, for calling a transfer-destination telephone by requesting a response from the transfer-destination telephone indicating its availability to connect a call upon receipt of a demand to transfer the voice communication to the transfer destination telephone;

means for notifying an address of the transfer-destination telephone to the transfer-source telephone upon receipt of a response from the transfer-destination telephone indicating its availability to connect a call; and means for continuing the voice communication with the transfer-source telephone when the transfer-destination telephone does not return a response to the request indicating its availability to connect a call, thereby indicating that the transfer-destination telephone is not available to connect a call.

* * * * *

UNITED STATES PATENT AND TRADEMARK OFFICE
CERTIFICATE OF CORRECTION

PATENT NO. : 6,917,676 B2
DATED : July 12, 2005
INVENTOR(S) : T. Yoshida et al.

It is certified that error appears in the above-identified patent and that said Letters Patent is hereby corrected as shown below:

<u>Title page,</u>
Item [73], Assignees, should be
-- Hitachi Communication Technologies, LTD., Tokyo (JP);
  Telecom Kiki, LTD., Fukushima-ken (JP) --.

Signed and Sealed this

Twentieth Day of September, 2005

JON W. DUDAS
*Director of the United States Patent and Trademark Office*